United States Patent [19]

Guerriero et al.

[11] Patent Number: 4,676,338

[45] Date of Patent: Jun. 30, 1987

[54] COMPOSITE MATERIAL

[75] Inventors: Renato Guerriero; Ilario Tangerini; Italo Vittadini, all of Mestre, Italy

[73] Assignee: Samim S.p.A., Rome, Italy

[21] Appl. No.: 733,525

[22] Filed: May 13, 1985

[30] Foreign Application Priority Data

Dec. 21, 1984 [IT] Italy .................. 24195 A/84

[51] Int. Cl.$^4$ .......... E04B 1/82; C22C 11/00; B32B 15/08; H01M 4/38
[52] U.S. Cl. .................. 181/294; 429/225; 429/226; 428/539.5; 420/563; 420/566
[58] Field of Search ............ 428/539.5; 420/563, 420/566; 75/77, 120; 181/294; 429/225, 226, 217

[56] References Cited

U.S. PATENT DOCUMENTS

| | | | |
|---|---|---|---|
| 2,828,351 | 3/1958 | Rade | 429/217 |
| 3,024,296 | 3/1962 | Adler | 429/217 |
| 3,060,254 | 10/1962 | Urry | 429/217 |
| 3,210,166 | 10/1965 | Carlson | 29/180 |
| 3,496,020 | 2/1970 | Jackson et al. | 429/217 |
| 4,071,946 | 2/1978 | Nilsson | 429/217 |
| 4,439,497 | 3/1984 | Difoggio | 428/539.5 |

FOREIGN PATENT DOCUMENTS

| | | | |
|---|---|---|---|
| 231178 | 12/1985 | Fed. Rep. of Germany | 429/217 |
| 2011005 | 2/1970 | France | 429/226 |
| 49-28530 | 7/1974 | Japan | 429/226 |
| 53-6844 | 1/1978 | Japan | 429/217 |
| 54-11690 | 5/1979 | Japan | 181/294 |
| 54-157727 | 12/1979 | Japan | 420/566 |
| 56-168368 | 12/1981 | Japan | 429/226 |

OTHER PUBLICATIONS

Polonsky et al, "Lightweight Cellular Metal" *Modern Castings Feb. 1961*, pp. 57, 72, 75 and 79.

*Primary Examiner*—John F. Terapane
*Assistant Examiner*—Eric Jorgensen
*Attorney, Agent, or Firm*—Hedman, Gibson, Costigan & Hoare

[57] ABSTRACT

The present invention relates to a composite material comprising a porous lead alloy containing from 0.7 to 1.0% silver or 0.1 to 1.0% calcium or 0.7 to 1.0% silver and 0.1 to 1.0% calcium and having its pores filled by a resin such as epoxy resin. The product has utility as a battery electrode and as a sound absorbing material.

10 Claims, No Drawings

COMPOSITE MATERIAL

The present invention relates to a composite material. More particularly, the present invention relates to a composite material constituted by a porous metal or by a porous metal alloy with intercommunicating cavities, wherein the pore cavities are at least partly filled with a resin solid at room temperature.

Still more particularly, the present invention relates to a composite material constituted by porous lead or lead alloy with intercommunicating pores, or in a spongy form, with their cavities being at least partly filled with a thermoplastic resin solid at room temperature (besides being solid at their use temperature), having mechanical properties (and in particular creep strength) equal to or better than those of lead or of lead alloys. When required, the resins are limited to those resins which, in addition to the hereinabove mentioned properties, possess also chemical resistance properties, and are in particular insoluble in acids or in alkalies. It is interesting to observe that the latter material described, i.e., that on the basis of Pb or of alloys thereof with resins insoluble in acids, may be used as material for forming anodes of electrolytic cells suitable to operate in the presence of acid or of alkaline solutions.

In particular, the latter described material has such characteristics of weight, of mechanical and chemical resistance, as well as of ageing resistance, as to advantageously replace traditional anodes for the electrowinning of nonferrous metals.

In the electrolytic cells for the extraction of nonferrous metals, the anodes are constituted by a flat or bore-bearing plate of Pb-Ag and/or Ca alloy (containing from 0.7 to 1% of Ag and from 0.1 to 1% of Ca) or of lead without alloying elements.

The material on the basis of Pb or of alloys thereof and resins insoluble in acids or in alkanols according to the invention allows, with their performances being equal, anodes to be manufactured with a smaller amount of Pb-Ag and/or Ca alloy, or of lead without alloying elements, with a consequent reduction of weight, and of the cost thereof, also thanks to the reduction of silver consumption, when this is used. The anodes made according to the invention may operate within a temperature range of from −10° C. to 80° C.

The material according to the invention may have, in addition to its use as material for anodes as hereinabove mentioned, a use as electrode material for batteries and as material for acoustical insulation (phonoabsorbent material).

As for the relative amounts of the metal (or of the alloy and of the resin, it is to be observed that the resin is present in the material in an amount of from 30 to 90% of total volume, whichever the metal or the alloy may be, and hence also in the case of lead or of its alloys previously mentioned.

As for the resin, it is in particular an epoxy resin and among epoxy resins, araldite is in particular mentioned.

The composite material according to the invention is prepared in a series of stages, which first envisage the manufacturing of a porous or sponge-like body with the metal or the alloy in the molten state, the solidification of the porous or sponge-like body and the filling of the cavities of the sponge-like or porous body with the resin in the liquid state, which is subsequently transformed into a solid. The spongy body may be manufactured by means of one of known methods, e.g., in the case of lead, by pouring molten lead into an ingot mould containing pellets of sodium chloride, cooling the whole and then dissolving with water the sodium chloride encased within the cavities.

The spongy lead is then impregnated with liquid resin; the whole is then caused to harden.

Examples shall be now given to the purpose of illustrating the invention, it being intended that it is not to be considered as being limited by them or to them.

(USE) EXAMPLES 1 TO 8

An anode constituted by a porous plate of lead containing electrolytic 45% by volume of araldite D was used in an electrolytic cell for the recovery of zinc from a zinc sulphate solution.

A conventional anode in a reference cell was used to the same purpose; said anode was constituted by lead alloyed with 0.75% of Ag.

In the Tables for the various Examples the results obtained are reported (with 2 the anode according to the invention, and with 1 the reference anode has been indicated).

To the electrolytic cell the solution of zinc sulphate has been fed with continuity.

The temperature has been maintained at about 27° C. and the current density applied has been of about 500 A/m$^2$. The tests had a duration of some months with the following results:

TABLE

| Example | ZnSO$_4$ Feed Flow rate g/l | Additive g/l | H$_2$SO$_4$ g/l | Zn g/l | V. Max 1 | V. Max 2 | V. Min 1 | V. Min 2 | Average V. 1 | Average V. 2 | Weight of deposit 1 | Weight of deposit 2 | Faradic yield % 1 | Faradic yield % 2 |
|---|---|---|---|---|---|---|---|---|---|---|---|---|---|---|
| 1 | 0.4 | Glue 0.02 | 118.5 | 93.5 | 3.51 | 3.52 | 3.21 | 3.28 | 3.337 | 3.337 | 232.7 | 181.5 | 94.37 | 76.60 |
| 2 | 0.4 | " | 118.5 | 93.5 | 3.61 | 3.67 | 3.26 | 3.36 | 3.320 | 3.480 | 242.1 | 243.1 | 95.40 | 95.80 |
| 3 | 0.4 | " | 118.5 | 93.5 | 3.44 | 3.38 | 3.25 | 3.19 | 3.280 | 3.218 | 236.6 | 237.4 | 95.49 | 95.81 |
| 4 | 0.4 | " | 118.5 | 84.75 | 3.61 | 3.64 | 3.26 | 3.22 | 3.310 | 3.308 | 246.4 | 242 | 95.95 | 94.23 |
| 5 | 0.4 | " | 106.5 | 80.80 | 3.40 | 3.19 | 3.23 | 3.15 | 3.308 | 3.238 | 243.1 | 239.7 | 94.89 | 93.56 |
| 6 | 0.4 | " | 106.5 | 80.80 | 3.37 | 3.25 | 3.22 | 3.15 | 3.304 | 3.201 | 240.9 | 234 | 94.61 | 91.90 |
| 7 | 0.4 | " | 106.5 | 80.80 | 3.71 | 3.58 | 3.18 | 3.18 | 3.279 | 3.230 | 240.7 | 239 | 94.58 | 93.91 |
| 8 | 0.4 | " | 106.5 | 80.80 | 3.39 | 3.24 | 3.18 | 3.16 | 3.245 | 3.197 | 231.9 | 230.3 | 92.97 | 92.08 |

We claim:

1. A composite material comprising lead or a lead alloy containing from 0.7 to 1.0% of silver, from 0.1 to 1.0% of calcium or from 0.7 to 1.0% of silver and from 0.1 to 1.0% of calcium and having pores filled with a resin which is solid at room temperature.

2. The composite material according to claim 1 wherein the resin is a thermoplastic resin insoluble in acids or alkalies and has a creep strength at least equal to that of lead or said lead alloy.

3. The composite material according to claim 2 wherein the resin is present in an amount of from 30 to 90 volume percent based on the overall volume of the composite material.

4. The composite material according to claim 3, wherein the resin is an epoxy resin.

5. The composite material according to claim 2 wherein the resin is an epoxy resin.

6. The composite material according to claim 1, wherein the resin is an epoxy resin.

7. The composite material according to claim 1 wherein the resin is present in an amount of from 30 to 90 volume percent based on the overall volume of the composite material.

8. The composite material according to claim 1 in the form of electrode operable in the presence of an acid or an alkaline solution.

9. The composite material according to claim 1 in the form of an electrode for use in batteries.

10. The composite material of claim 1 in the form of a sound-absorbing material.

* * * * *